(12) United States Patent
King

(10) Patent No.: US 7,973,424 B2
(45) Date of Patent: Jul. 5, 2011

(54) METHOD AND APPARATUS FOR PRODUCING TRACTIVE EFFORT WITH INTERFACE TO OTHER APPARATUS

(75) Inventor: Robert Dean King, Schenectady, NY (US)

(73) Assignee: General Electric Company, Schenectady, NY (US)

(*) Notice: Subject to any disclaimer, the term of this patent is extended or adjusted under 35 U.S.C. 154(b) by 172 days.

(21) Appl. No.: 12/418,039

(22) Filed: Apr. 3, 2009

(65) Prior Publication Data

US 2010/0253139 A1 Oct. 7, 2010

(51) Int. Cl.
*B60L 1/00* (2006.01)
(52) U.S. Cl. ...................................... 307/10.1
(58) Field of Classification Search .................. 307/126, 307/10.1, 9.1, 31, 38; 290/40 B
See application file for complete search history.

(56) References Cited

U.S. PATENT DOCUMENTS

| | | | |
|---|---|---|---|
| 5,373,195 A | 12/1994 | De Doncker et al. | |
| 5,552,640 A * | 9/1996 | Sutton et al. | 290/40 B |
| 5,710,699 A | 1/1998 | King et al. | |
| 5,903,449 A | 5/1999 | Garrigan et al. | |
| 6,410,992 B1 * | 6/2002 | Wall et al. | 290/52 |
| 7,036,028 B2 * | 4/2006 | Zalesski | 713/320 |
| 7,049,792 B2 | 5/2006 | King | |
| 7,800,251 B2 * | 9/2010 | Hodges et al. | 307/126 |
| 2005/0122071 A1 | 6/2005 | King et al. | |

* cited by examiner

*Primary Examiner* — Albert W Paladini
(74) *Attorney, Agent, or Firm* — Ziolkowski Patent Solutions Group, SC; Jean K. Testa

(57) ABSTRACT

An apparatus and method for determining and providing a controlled power from a first apparatus to another apparatus is disclosed. The apparatus includes an energy source configured to generate a power output, a power converter electrically connected to the energy source to receive the power output and to output a conditioned power, and a transfer switch configured to selectively couple the conditioned power to an external apparatus. The apparatus also includes a controller in communication with the external apparatus and configured to receive apparatus parameter data related to the external apparatus, determine a power requirement of the external apparatus based on the apparatus parameter data, operate the power convertor to output conditioned power that meets the power requirement of the external apparatus, and control the transfer switch to couple the conditioned power that meets the power requirement to the external apparatus.

25 Claims, 5 Drawing Sheets

METHOD AND APPARATUS FOR PRODUCING TRACTIVE EFFORT WITH INTERFACE TO OTHER APPARATUS

BACKGROUND OF THE INVENTION

The invention relates generally to an apparatus for producing tractive effort and, more particularly, to an apparatus and method for determining and providing a controlled power from a first apparatus to another apparatus.

Recently, electric vehicles and plug-in hybrid electric vehicles have become increasingly popular. These vehicles are typically powered by an energy storage system including one or more batteries, either alone or in combination with an internal combustion engine. In electric vehicles, the one or more batteries power the entire drive system, thereby eliminating the need for an internal combustion engine. Plug-in hybrid electric vehicles, on the other hand, include a small internal combustion engine to supplement the battery power, which greatly increases the fuel efficiency of the vehicle.

In conventional internal combustion engine (ICE) vehicles, the range is typically limited by the amount of fuel stored in the tank. If the length of travel exceeds the amount of stored energy, i.e. fuel in the tank, operation of the vehicle is stopped until additional fuel is added to the tank from a storage container or service truck. Likewise, if the useable energy in the conventional vehicle's 12 V Starting, Lighting, Ignition (SLI) battery is insufficient to start the heat engine, the SLI battery can be jump started using another vehicle via a set of jumper cables or a service truck can provide a "boost" charge via a separate 12 V battery or from a portable engine driven generator.

In today's Hybrid Vehicles (HEV's) and future Plug-in Hybrid Vehicles (PHEV), if the amount of useable stored on-board electric energy is below a given threshold but there is fuel in the tank, generally the vehicle will operate, but with reduced performance, (acceleration and hill climbing ability) and reduced fuel economy while the heat engine runs providing power to propel the vehicle and also to recharge the electrical storage unit(s). In the event that both the electrical energy storage unit is depleted and there is no fuel in the tank, then the entire propulsion drive is not operational and the vehicle will require either charging of the on-board traction battery from another source/vehicle to allow operation on the electric drive alone or the addition of fuel to the tank and provision of sufficient electrical energy to start the engine. However, in existing HEVs, there is no apparatus or associated control means that allow either cranking of the engine or charging of the traction energy storage unit from another vehicle due to non-standard voltage ratings of the energy storage unit(s).

Similarly, in today's pure electric vehicles (EVs), if the amount of useable stored on-board electric energy is below a given threshold, then the electric propulsion drive is not operational and the vehicle will require charging of the on-board traction battery from another source/vehicle. The ability to jump start the EV from another vehicle (conventional ICE, Hybrid, or Electric) is not normally an option due to non-standard voltage ratings of the energy storage unit(s), and lack of appropriate interface controls. Similarly, if a service truck is requested for assistance, the service truck generally is not equipped to provide a charge to the traction batteries of the electric vehicle. Based on the inability of existing cars and tow trucks to jump start the electric vehicle, it is often necessary to tow the electric vehicle to a garage or facility with proper charging equipment.

Therefore, a need exists for an apparatus and associated control means that allow one electric or hybrid vehicle or apparatus with relatively large amount of stored on-board energy to be used to either crank the engine or charge the traction energy storage unit in another vehicle or apparatus.

BRIEF DESCRIPTION OF THE INVENTION

The invention is a directed method and apparatus for determining and providing a controlled power from a first apparatus to another apparatus In accordance with one aspect of the invention, an apparatus includes an energy source configured to generate a power output, a power converter electrically connected to the energy source to receive the power output and to output a conditioned power, and a transfer switch configured to selectively couple the conditioned power to an external apparatus. The apparatus also includes a controller in communication with the external apparatus and configured to receive apparatus parameter data related to the external apparatus, determine a power requirement of the external apparatus based on the apparatus parameter data, operate the power convertor to output conditioned power that meets the power requirement of the external apparatus, and control the transfer switch to couple the conditioned power that meets the power requirement to the external apparatus.

In accordance with another aspect of the invention, a method for providing power to an external apparatus includes the step of interfacing a charging apparatus with the external apparatus, the charging apparatus comprising a energy source configured to generate a power output and a transfer switch configured to selectively electrically couple the charging apparatus to the external apparatus. The method also includes the steps of receiving apparatus parameter data on the external apparatus, determining a power requirement of the external apparatus based on the apparatus parameter data, controlling the transfer switch to electrically couple the charging apparatus to the external apparatus, and transferring power from the charging apparatus to the external apparatus at the determined power requirement.

In accordance with yet another aspect of the invention, a control system for controlling a supply of power from a vehicular energy source is programmed to receive apparatus parameter data of an external vehicular energy source and determine a power requirement of the external vehicular energy source based on the apparatus parameter data. The control system is further programmed to cause a power converter electrically connected to the vehicular energy source to generate conditioned power that meets the power requirement of the external vehicular energy source and actuate a transfer switch connected to the power converter source to electrically couple the power converter and the external vehicular energy source, thereby transferring the conditioned power from the power converter to the external vehicular energy source.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed to systems and methods for determining and providing a controlled power from a first apparatus to another apparatus. The system includes an apparatus for producing tractive effort, a power converter configured to receive a power output from the apparatus and output a conditioned power, and a transfer switch to selectively couple the conditioned power to an external apparatus. The system also includes a controller in communication with the external apparatus and configured to receive apparatus parameter data from the external apparatus, determine a power requirement of the external apparatus based on the apparatus parameter data, operate the power convertor to output conditioned power that meets the power requirement of the external apparatus, and control the transfer switch to couple the conditioned power meeting the power requirement to the external apparatus.

Figure 1:
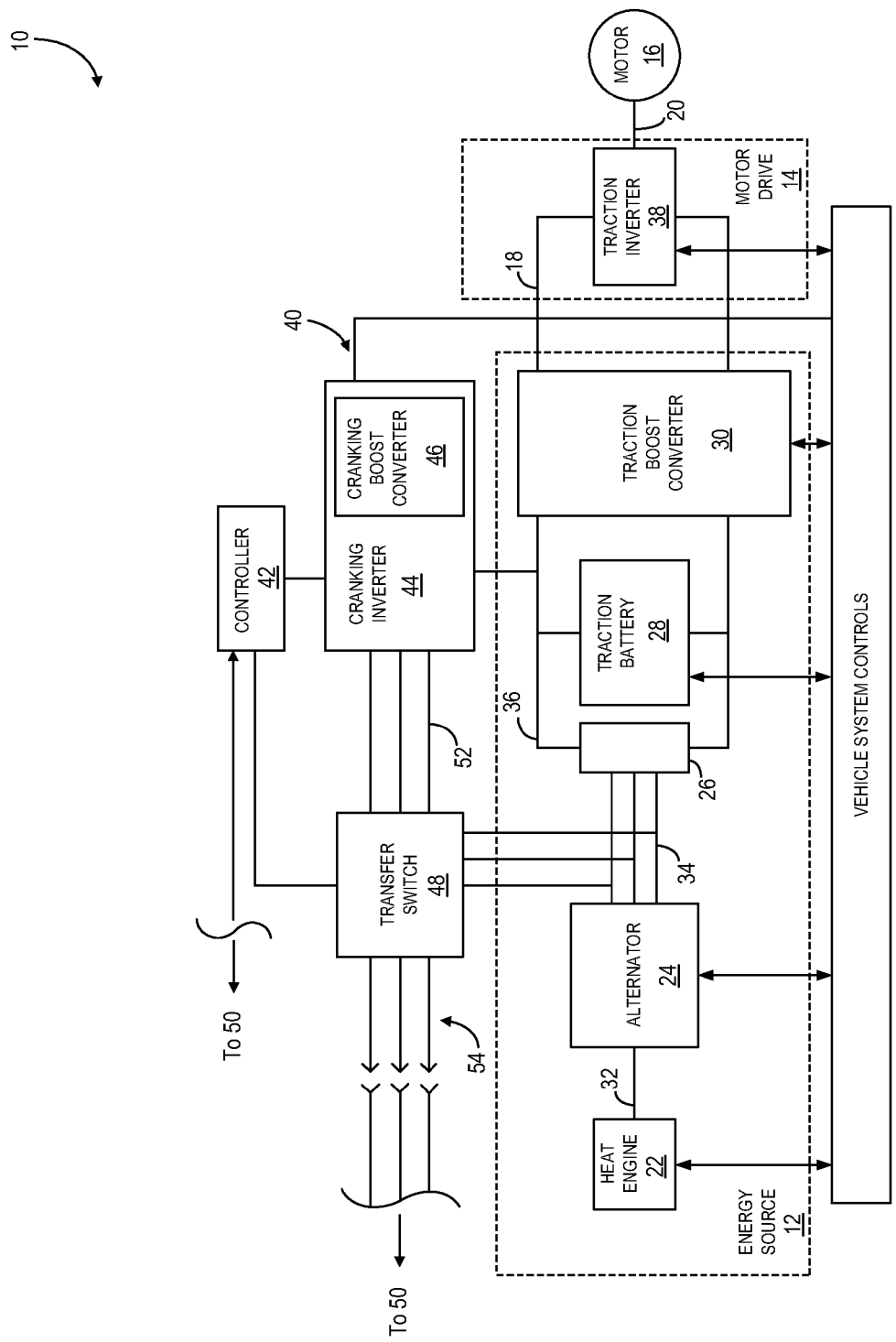
FIG. 1 is a block schematic diagram of an apparatus for producing tractive effort with interface to an external apparatus according to an embodiment of the invention.

FIG. 1 illustrates a block diagram of an apparatus 10 for providing a controlled power. According to an exemplary embodiment of the invention, apparatus 10 is configured as an apparatus for producing tractive effort and is incorporated into an electric or hybrid-electric vehicle. As shown in FIG. 1, apparatus 10 for producing tractive effort comprises an energy source 12, a motor drive 14, and a motor 16. In operation, energy source 12 generates a high DC voltage 18. Motor drive 14 generates a motor voltage 20 from high DC voltage 18, and motor 16 produces tractive effort from motor voltage 20. As used herein, motor 16 refers to any electrical apparatus capable of producing mechanical power from electrical power including, without limitation, single phase or multiple phase, AC (alternating current) or DC motors.

In the embodiment of FIG. 1, energy source 12 is configured as a hybrid-electric energy source that comprises a heat engine 22, an alternator 24, a rectifier 26, a traction/energy battery 28, and a traction boost converter 30. Traction boost converter 30 is sometimes referred to as bi-directional DC-DC converter, or a bi-directional boost/buck converter that functions to decouple the voltage between the input and the output of the device while efficiently transferring power. In operation, heat engine 22 generates mechanical power 32 by burning a fuel. Alternator 24 generates an alternating voltage 34 from mechanical power 32 and rectifier 26 then rectifies alternating voltage 34 to produce a low DC voltage 36. Energy battery 28 stores and delivers energy derived from low DC voltage 36, and traction boost converter 30 boosts low DC voltage 36 to produce high DC voltage 18. As used herein in reference to DC voltages, "low" and "high" are relative terms only and imply no particular absolute voltage levels. The high DC voltage 18 is transferred to motor drive 14, which includes therein a traction converter 38 that receives high DC voltage 18 and, responsive thereto, generates motor voltage 20 from high DC voltage 18 during motoring operation. Additionally, traction converter 38 generates high DC voltage 18 from motor voltage 20 during braking operation. During a braking operation, the high DC voltage 18 is produced from motor voltage 20 and the power flow is from the high voltage side 18 of the bi-directional DC-DC converter 30 to the lower voltage side 36 of the bi-directional DC-DC converter 30 through a "buck" mode of operation.

As further shown in FIG. 1, apparatus 10 includes a power converter 40 and a controller 42 (i.e., vehicle system controls) configured to control operation of the power converter 40. According to one embodiment of the invention, power converter 40 includes therein a bi-directional cranking inverter 44 and charging boost converter 46. A transfer switch 48 is also included in apparatus 10 and is controlled by controller 42 to selectively couple the power converter 40 to components of the apparatus 10 and/or an external apparatus 50. During normal operation of the apparatus 10 to produce tractive effort, controller 42 operates power converter 40 and transfer switch 48 to receive/provide power from/to energy source 12. During a "cranking operation," in which alternator 24 is used as a motor to apply torque for cranking and/or starting heat engine 22, controller 42 controls cranking inverter to generate a cranking voltage 52 at a desired frequency from low DC voltage 36. The transfer switch 48 is then controlled to selectively couple the cranking voltage 52 to alternator 24. Alternatively, during a charging operation, controller 42 controls charging boost converter 46 to boost alternating voltage 34 to a higher voltage more suitable for charging energy/traction battery 28.

According to an embodiment of the invention, power generated by apparatus 10 is conditioned and controlled for transfer to an external apparatus 50 during a "transfer" mode of operation. During this "transfer" mode of operation, controller 42 acts to control operation of power converter 40 and transfer switch 48 to selectively provide a conditioned power 54 to the external apparatus 50. The conditioned power can be supplied to, for example, crank an engine (not shown) in the external device 50 and/or recharge an energy storage system (not shown) in the external device 50. When operating in transfer mode, controller 42 acts to receive apparatus parameter data from the external apparatus 50, which can include a battery voltage, a battery rate, a battery state-of-charge, and a vehicle make and model of the external apparatus. Based on this external apparatus parameter data, the controller 42 determines a power requirement of the external apparatus 50 and operates the power convertor 40 to output conditioned power that meets the power requirement of the external apparatus 50 (e.g., cranking voltage at a desired frequency). The controller 42 can then control operation of the transfer switch 48 to couple the conditioned power to the external apparatus 50.

Figure 2:
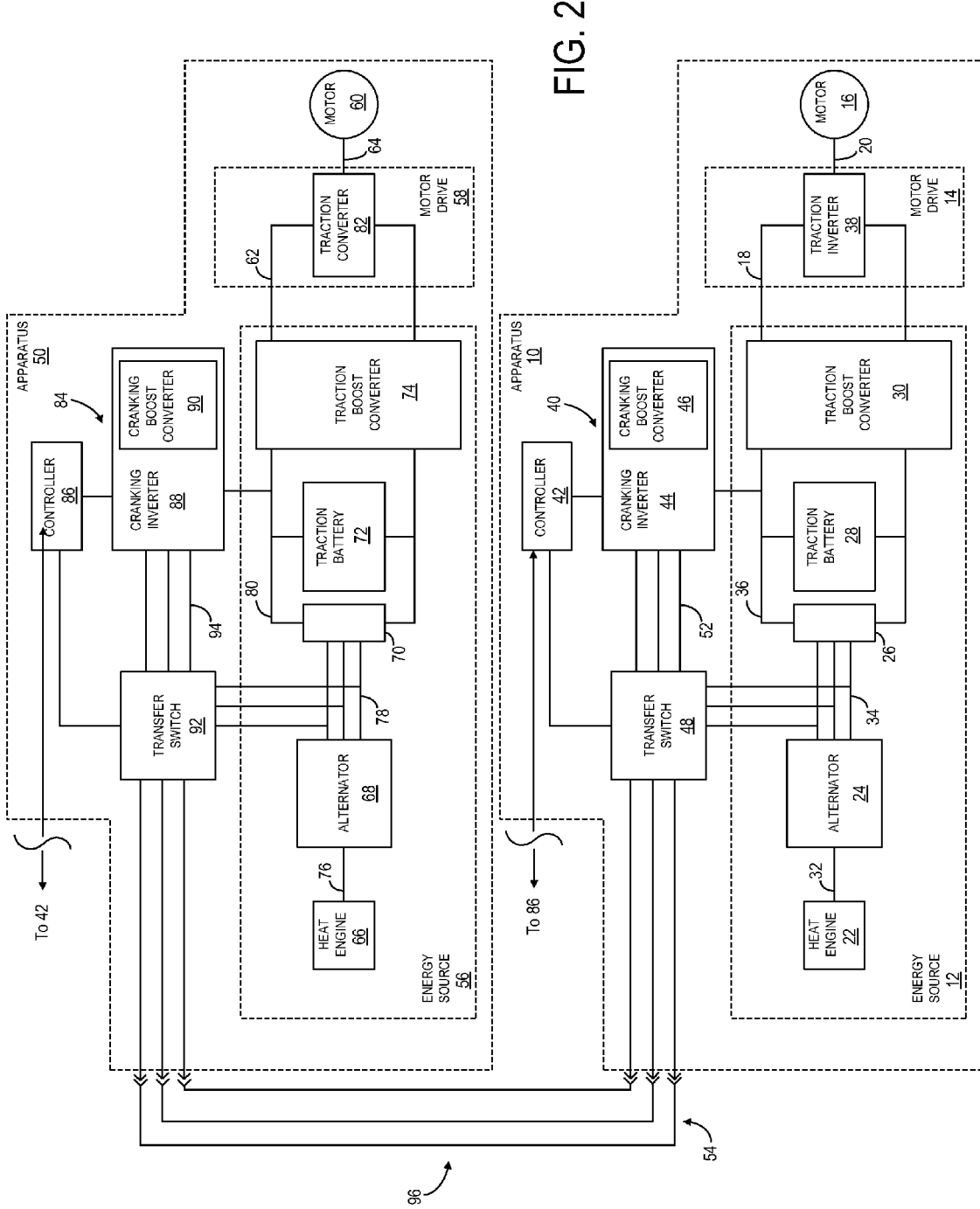
FIG. 2 is a block schematic diagram of the apparatus of FIG. 1 interfaced with an external apparatus for producing tractive effort to provide conditioned power thereto according to an embodiment of the invention.

Referring now to FIG. 2, apparatus 10 is shown interfaced with a similar external apparatus 50 so as to provide cranking power or recharging power thereto during the transfer mode of operation. In the embodiment of FIG. 2, apparatus 10 is incorporated into a hybrid-electric vehicle and supplies power to external apparatus 50, which is also incorporated into a hybrid-electric vehicle. External apparatus 50 comprises an apparatus for producing tractive effort and includes therein an energy source 56, a motor drive 58, and a motor 60. In operation, energy source 56 generates a high DC voltage 62. Motor drive 58 generates a motor voltage 64 from high DC voltage 62, and motor 60 produces tractive effort from motor voltage 64.

In the embodiment of FIG. 2, energy source 56 is configured as a hybrid-electric energy source that comprises a heat engine 66, an alternator 68, a rectifier 70, an energy/traction battery 72, and a traction boost converter 74. In operation, heat engine 66 generates mechanical power 76 by burning a fuel. Alternator 68 generates an alternating voltage 78 from mechanical power 76 and rectifier 70 then rectifies alternating voltage 78 to produce a low DC voltage 80. Energy battery 72 stores and delivers energy derived from low DC voltage 80, and traction boost converter 74 boosts low DC voltage 80 to produce high DC voltage 62. The high DC voltage 62 is transferred to motor drive 58, which includes therein a traction converter 82 that receives high DC voltage 62 and, responsive thereto, generates motor voltage 64 from high DC voltage 62 during motoring operation. Additionally, traction converter 82 generates high DC voltage 62 from motor voltage 64 during braking operation.

As further shown in FIG. 2, external apparatus 50 includes a power converter 84 and a controller 86 configured to control operation of the power converter 84. According to one embodiment of the invention, power converter 84 includes therein a bi-directional cranking inverter 88 and charging boost converter 90. A transfer switch 92 is also included in external apparatus 50 and is controlled by controller 86 to selectively couple the power converter 84 to components of the external apparatus 50 and/or to apparatus 10. During normal operation of the external apparatus 50 to produce tractive effort, controller 86 operates power converter 84 and transfer switch 92 to receive/provide power from/to energy source 56. During a "cranking operation," in which alternator 68 is used as a motor to apply torque for cranking and/or starting heat engine 66, controller 86 controls cranking inverter 88 to generate a cranking voltage 94 at a desired frequency from low DC voltage 80. The transfer switch 92 is then controlled to selectively couple the cranking voltage 94 to alternator 68. Alternatively, during a charging operation, controller 86 controls charging boost converter 90 to boost alternating voltage 78 to a higher voltage more suitable for charging energy battery 72.

According to an embodiment of the invention, when it is desired to transfer power from apparatus 10 to external apparatus 50, such as when traction battery 72 is depleted, an electrical interface cable 96 is used to connect the apparatus 10 to the external apparatus 50. As shown in FIG. 2, the electrical interface cable 96 is connected to the transfer switches 48, 92 to allow for the transfer of conditioned power 54 therebetween. According to an embodiment of the invention, controller 42 is configured to determine when the electrical interface cable 96 is connected to transfer switch 48. When controller 42 determines that the electrical interface cable 96 is connected to transfer switch 48, controller 42 actuates or controls transfer switch 48 to electrically couple apparatus 10 to external apparatus 50, so as to allow for transfer of conditioned power 54 therebetween.

Controller 42 is further configured to communicate with controller 86 in order to determine what level of power (i.e., current and voltage levels/frequency) is needed to either recharge traction battery 72 and/or crank heat engine 66. That is, controller 42 receives from controller 86 (such as through wireless communication or using electrical interface cable 96, for example) apparatus parameter data on the external apparatus 50, which can include a battery voltage, a battery rate, battery temperature, or a battery state-of-charge of traction battery 72, a fuel level, and/or a vehicle make and model of the vehicle in which external apparatus 50 is incorporated. Alternatively, it is also recognized that the apparatus parameter data related to the external apparatus 50 could be manually input into controller 42.

Based on the received apparatus parameter data, controller 42 is programmed to determine a power requirement of the external apparatus 50. That is, based on the received apparatus parameter data, controller 42 is programmed to determine whether to supply a current/voltage to external apparatus 50 to crank heat engine 66 in the external device 50 and/or to supply a current/voltage to external apparatus 50 to recharge energy storage system 72 (i.e., traction battery) in the external device 50. Controller 42 determines a power requirement for the cranking/recharging operation and, responsive thereto, controls power converter 40 (i.e., controls cranking inverter 44 and/or charging boost converter 46) to generate a conditioned power 54 that meets the determined power/voltage requirement. The conditioned power 54 can, for example, comprise an AC power output having a desired frequency suitable for providing cranking/recharging of the energy source 56 in external apparatus 50. It is also recognized, however, that the conditioned power 54 can be in the form of a DC power output. As shown in FIG. 2, the conditioned power 54 generated by power converter 40 is passed through transfer switch 48 (which is in its "transfer mode" position) and electrical interface cable 96 to transfer switch 92 of external apparatus 50, where it is then directed to one (or both) of the heat engine 66 and traction battery 72 to "jump-start" external apparatus 50.

Figure 3:
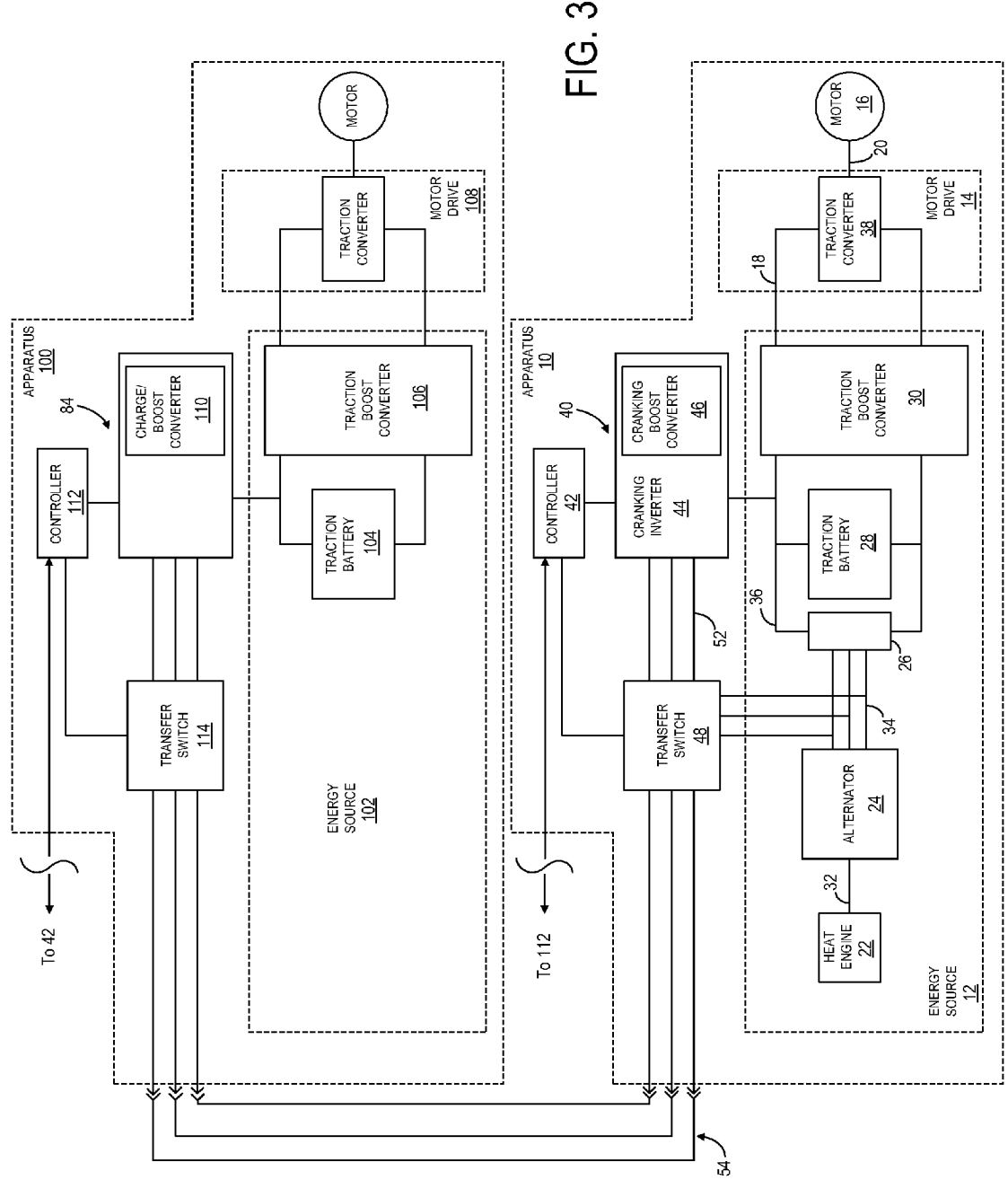
FIG. 3 is a block schematic diagram of the apparatus of FIG. 1 interfaced with an external apparatus for producing tractive effort to provide conditioned power thereto according to another embodiment of the invention.

Referring now to FIG. 3, apparatus 10 is shown interfaced with an external apparatus 100 that is incorporated into an electric vehicle so as to provide recharging power thereto during the transfer mode of operation, according to another embodiment of the invention. That is, as shown in FIG. 3, apparatus includes an energy source 102 configured as an electric energy source that comprises an energy/traction battery 104 and a traction boost converter 106. In an exemplary embodiment, energy battery 104 is in the form of a high voltage traction battery having an energy rating of 15 kWh or more. In operation, energy battery 104 provides power to traction boost converter 106, which boosts and transfers the power to motor drive 108.

External apparatus 100 includes a power converter 110 and a controller 112 configured to control operation of the power converter 110. As shown in FIG. 3, power converter 110 is configured as a charging boost converter. A transfer switch 114 is also included in external apparatus 100 and is controlled by controller 112 to selectively couple the charging boost converter 110 to apparatus 10. According to an embodiment of the invention, when it is desired to transfer power from apparatus 10 to external apparatus 100, such as when traction battery 104 is depleted, controller 42 actuates or controls transfer switch 48 to electrically couple apparatus 10 to external apparatus 100, so as to allow for transfer of conditioned power 54 therebetween.

Based on apparatus parameter data related to the external apparatus 100 received by controller 42, such as battery voltage, battery rate, battery temperature, battery state-of-charge, and/or a vehicle make and model of the vehicle in which external apparatus 100 is incorporated, controller 42 determines a power requirement of the external apparatus 100. That is, based on the received apparatus parameter data, controller 42 is programmed to determine an appropriate power to supply to external apparatus 100 to recharge energy storage system 104 (i.e., traction battery). Controller 42 determines a power requirement for the recharging operation and, responsive thereto, controls charging boost converter 46 to generate a conditioned power that meets the determined power/voltage requirement. The conditioned power can, for example, comprise an AC output having a desired frequency suitable for providing recharging of the energy traction battery in external apparatus 100.

Figure 4:
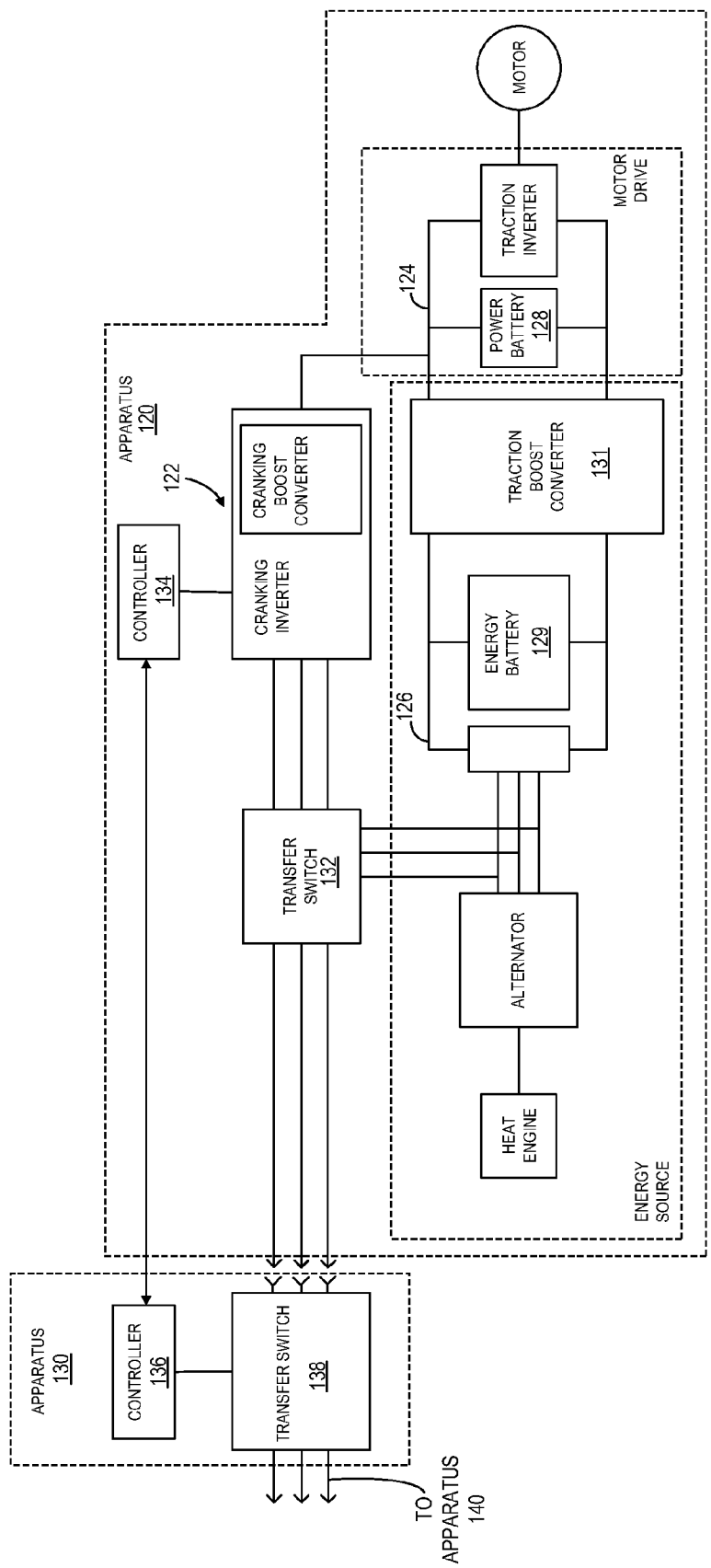
FIG. 4 is a block schematic diagram of an apparatus for producing tractive effort with interface to an external apparatus according to another embodiment of the invention.

Referring now to FIG. 4, another embodiment of an apparatus 120 for producing tractive effort is shown. In this alternative embodiment, power converter 122 is fed from high DC voltage 124 instead of from low DC voltage 126 and may be used to charge power battery 128. Power converter 122 may also be used to charge energy battery 129 through traction boost converter 131. Also shown in FIG. 4, is the connection of apparatus 120 to one or more external apparatus 130, 140. That is, according to an embodiment of the invention, transfer switch 132 and controller 134 of apparatus 120 are configured to allow for transfer of conditioned power to more than one external apparatus 130, 140 to provide power thereto. As shown in FIG. 4, transfer switch 138 of apparatus 130 allows for transfer of conditioned power to apparatus 130, as well as interfacing to the additional apparatus 140. Controller 134 of apparatus 120 is thus configured to receive apparatus parameter data on each external apparatus 130, 140 to which apparatus 120 is electrically coupled, such as from controller 136 of external apparatus 130 and from controller(s) (not shown) of additional external apparatus 140. Based on the received apparatus parameter data, controller 134 is programmed to determine a power requirement for each external apparatus 130, 140.

Figure 5:
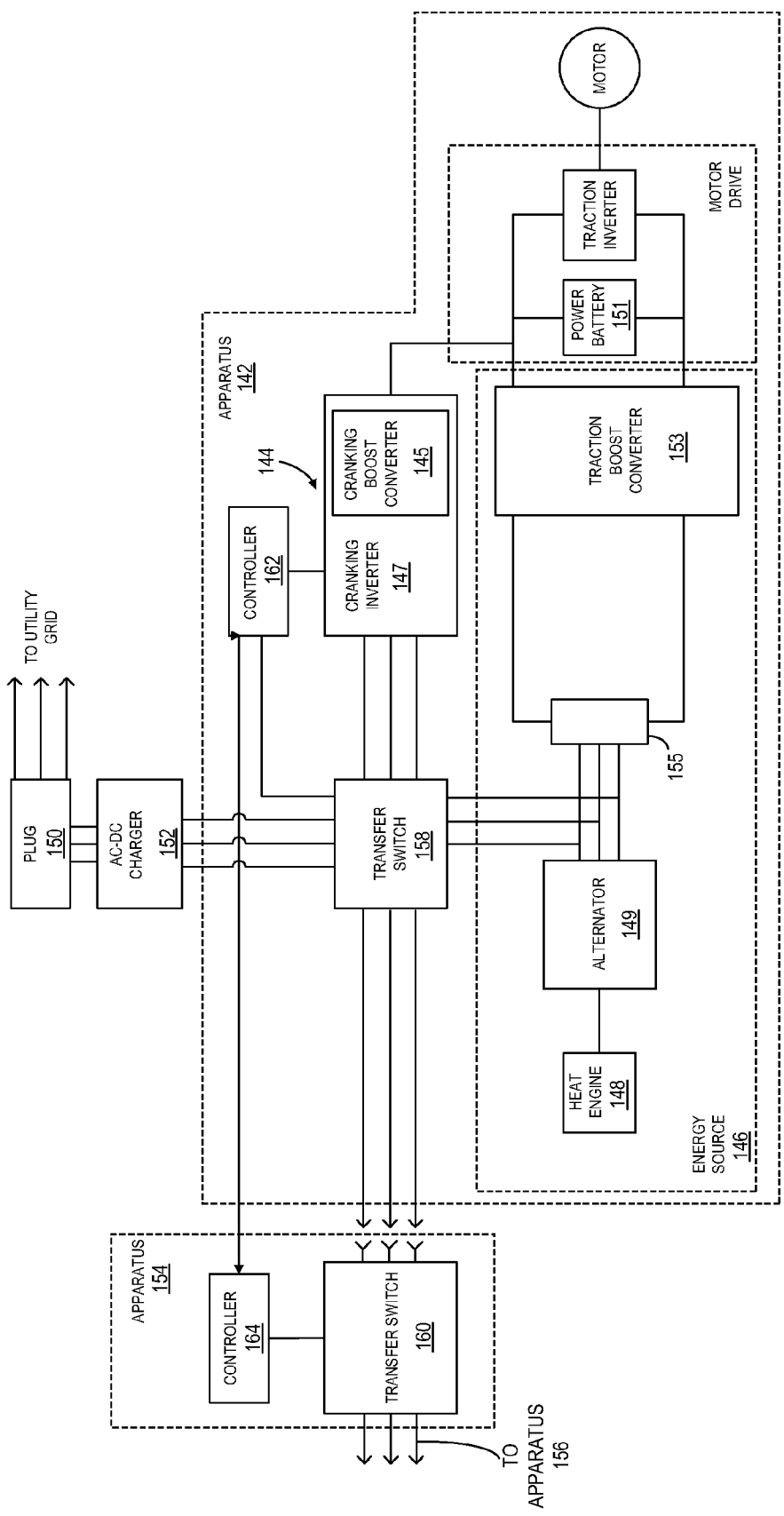
FIG. 5 is a block schematic diagram of an apparatus for producing tractive effort with interface to an external apparatus according to another embodiment of the invention.

Referring now to FIG. 5, according to another embodiment of the invention, an apparatus 142 is configured as a plug-in hybrid vehicle. The plug-in hybrid vehicle 142 includes therein a power converter 144 having a cranking boost converter 145 and cranking inverter 147. The plug-in hybrid vehicle 142 has a series hybrid configuration comprising an energy source 146 and a power battery 151. The energy source 146 includes a heat engine 148, an alternator 149, and a traction boost converter 153. It is recognized that traction boost converter 153 is coupled to a rectifier 155 on the low voltage side and could be implemented as a uni-directional or bi-directional boost converter, whereas the traction boost converters 30, 74, 106, 131 of FIGS. 1-4 are bi-directional boost converters. As shown in FIG. 5, a transfer switch 158 is also included in plug-in hybrid vehicle 142 and is controlled by controller 162 to selectively couple the power converter 144 to components of the vehicle and/or an external apparatus 154, 156. The power converter 144 functions to recharge power battery (via cranking boost converter 145) and/or crank heat engine 148 (via cranking inverter 147 and alternator 149).

The plug-in hybrid vehicle 142 further includes a plug-in 150 that allows for connection of the vehicle to a utility grid. When vehicle 142 is not in operation (and the utility grid is operable), the plug-in 150 can be connected to a utility grid to receive AC power therefrom. The AC power from the utility grid is passed through an AC-DC charger interface 152 (i.e., a voltage and current controlled rectifier) to condition the power for transfer charging power battery 151. The power received through plug in 150 from the utility grid is supplied to recharge the power battery 151.

As shown in FIG. 5, plug-in hybrid vehicle 142 is connected to one or more external apparatus 154, 156 by way of interfacing transfer switch 158 of vehicle 142 to a transfer switch 160 of external apparatus 154. The controller 162 of plug-in hybrid vehicle 142 is configured to receive apparatus parameter data on each external apparatus 154, 156 to which the vehicle is electrically coupled, such as from controller 164 of external apparatus 154 and from controller(s) (not shown) of additional external apparatus 156. Based on the received apparatus parameter data, controller 162 is programmed to determine a power requirement for each external apparatus 154, 156.

While embodiments of the invention set forth above describe a charging of an external apparatus 50, 100, 130, 140, 154, 156 by a charging apparatus 10, 120, 142 it is recognized that power transfer between the external apparatus and the charging apparatus may be bi-directional, and that the external apparatus 50, 100, 130, 140, 154, 156 could be used to jump-start apparatus 10, 120, 142. That is, as each apparatus includes an energy source, power converter, controller, and transfer switch, each apparatus is configured to provide a conditioned power to the other apparatus.

Also, while embodiments of the invention show the energy storage device in energy source as including only a single energy/traction battery, it is recognized that a plurality of batteries, battery arrangements, and or ultracapacitors could be used to form an energy storage device/system in electric or hybrid-electric energy sources.

Therefore, according to one embodiment of the invention, an apparatus includes an energy source configured to generate a power output, a power converter electrically connected to the energy source to receive the power output and to output a conditioned power, and a transfer switch configured to selectively couple the conditioned power to an external apparatus. The apparatus also includes a controller in communication with the external apparatus and configured to receive apparatus parameter data related to the external apparatus, determine a power requirement of the external apparatus based on the apparatus parameter data, operate the power convertor to output conditioned power that meets the power requirement of the external apparatus, and control the transfer switch to couple the conditioned power that meets the power requirement to the external apparatus.

According to another embodiment of the invention, a method for providing power to an external apparatus includes the step of interfacing a charging apparatus with the external apparatus, the charging apparatus comprising a energy source configured to generate a power output and a transfer switch configured to selectively electrically couple the charging apparatus to the external apparatus. The method also includes the steps of receiving apparatus parameter data on the external apparatus, determining a power requirement of the external apparatus based on the apparatus parameter data, controlling the transfer switch to electrically couple the charging apparatus to the external apparatus, and transferring power from the charging apparatus to the external apparatus at the determined power requirement.

According to yet another embodiment of the invention, a control system for controlling a supply of power from a vehicular energy source is programmed to receive apparatus parameter data of an external vehicular energy source and determine a power requirement of the external vehicular energy source based on the apparatus parameter data. The control system is further programmed to cause a power converter electrically connected to the vehicular energy source to generate conditioned power that meets the power requirement of the external vehicular energy source and actuate a transfer switch connected to the power converter source to electrically couple the power converter and the external vehicular energy source, thereby transferring the conditioned power from the power converter to the external vehicular energy source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
   an energy source configured to generate a power output;
   a power converter electrically connected to the energy source to receive the power output and to output a conditioned power;
   a transfer switch configured to selectively couple the conditioned power to an external apparatus; and
   a controller in communication with the external apparatus and configured to:
      receive apparatus parameter data related to the external apparatus;
      determine a power requirement of the external apparatus based on the apparatus parameter data;
      operate the power convertor to output conditioned power that meets the power requirement of the external apparatus; and
      control the transfer switch to couple the conditioned power that meets the power requirement to the external apparatus;
   wherein the apparatus and the external apparatus comprise one of an electric vehicle, a hybrid-electric vehicle, and a plug-in hybrid-electric vehicle.

2. The apparatus of claim 1 wherein the power converter comprises a cranking inverter configured to generate a voltage to crank an engine in the external apparatus.

3. The apparatus of claim 1 wherein the power converter comprises a boost converter configured to generate a voltage to charge an energy storage device in the external apparatus.

4. The apparatus of claim 1 wherein the energy source comprises an energy storage system having one or more energy storage devices.

5. The apparatus of claim 4 wherein the energy source comprises an internal combustion engine configured to provide recharging power to the energy storage system.

6. The apparatus of claim 1 wherein the external apparatus comprises:
   a power converter; and
   a transfer switch configured to selectively transfer the conditioned power to the power converter.

7. The apparatus of claim 1 wherein the apparatus parameter data comprises at least one of a battery voltage, a battery rate, a battery temperature, a battery state-of-charge, and a vehicle make and model.

8. The apparatus of claim 1 further comprising an electrical interface cable configured to connect the apparatus to the external apparatus.

9. The apparatus of claim 1 wherein the power converter comprises a bi-directional power converter.

10. The apparatus of claim 1 wherein the controller is further configured to determine a desired frequency of the conditioned power.

11. The apparatus of claim 1 wherein the energy source comprises a boost converter configured to increase voltage output to a boosted voltage output.

12. The apparatus of claim 11 further comprising a motor drive having a power battery therein, the motor drive electrically connected to the energy source to receive the boosted voltage output therefrom; and
   wherein the power converter is electrically connected to the motor drive to receive the boosted power output therefrom.

13. A method for providing power to an external apparatus comprising:
   interfacing a charging apparatus with the external apparatus, the charging apparatus comprising an energy source configured to generate a power output and a transfer switch configured to selectively electrically couple the charging apparatus to the external apparatus;
   receiving apparatus parameter data on the external apparatus, the apparatus parameter data comprising at least one of a battery voltage, a battery rate, a battery temperature, a battery state-of-charge, and a vehicle make and model;
   determining a power requirement of the external apparatus based on the apparatus parameter data;
   controlling the transfer switch to electrically couple the charging apparatus to the external apparatus; and
   transferring power from the charging apparatus to the external apparatus at the determined power requirement.

14. The method of claim 13 further comprising generating a re-charging power that is at the determined power requirement via a cranking boost converter in the charging apparatus.

15. The method of claim 13 further comprising generating a cranking power that is at the determined power requirement via a cranking inverter in the charging apparatus.

16. The method of claim 13 wherein interfacing the charging apparatus with the external apparatus comprises connecting an electrical interface cable between the charging apparatus and the external apparatus.

17. The method of claim 13 wherein interfacing the charging apparatus with the external apparatus comprises providing a communications interface between the charging apparatus and the external apparatus to send and receive the apparatus parameter data.

18. A control system for controlling a supply of power from a vehicular energy source, the control system programmed to:
   receive apparatus parameter data of an external vehicular energy source;
   determine a power requirement of the external vehicular energy source based on the apparatus parameter data;
   cause a power converter electrically connected to the vehicular energy source to generate conditioned power that meets the power requirement of the external vehicular energy source; and
   actuate a transfer switch connected to the power converter source to electrically couple the power converter and the external vehicular energy source, thereby transferring the conditioned power from the power converter to the external vehicular energy source.

19. The control system of claim 18 further programmed to:
   detect a connection of an electrical interface cable between the vehicular energy source and the external vehicular energy source; and
   actuate the transfer switch to electrically couple the power converter and the external vehicular energy source upon connection detection of the electrical interface cable.

20. The control system of claim 18 further programmed to determine a cranking voltage for the external vehicular energy source based on the apparatus parameter data.

21. The control system of claim 20 further programmed to determine a desired frequency of the cranking voltage for the external vehicular energy source based on the apparatus parameter data.

22. The control system of claim 18 further programmed to determine a re-charging voltage for the external vehicular energy source based on the apparatus parameter data.

23. The control system of claim 18 wherein the apparatus parameter data comprises at least one of a battery voltage, a battery rate, a battery temperature, a battery state-of-charge, and a vehicle make and model.

24. The control system of claim 18 further programmed to determine a desired frequency of the conditioned power.

25. An apparatus comprising:
   an energy source configured to generate a power output, the energy source including an energy storage system having one or more energy storage devices;
   a power converter electrically connected to the energy source to receive the power output and to output a conditioned power;
   a transfer switch configured to selectively couple the conditioned power to an external apparatus; and
   a controller in communication with the external apparatus and configured to:
      receive apparatus parameter data related to the external apparatus;
      determine a power requirement of the external apparatus based on the apparatus parameter data;
      operate the power convertor to output conditioned power that meets the power requirement of the external apparatus; and
      control the transfer switch to couple the conditioned power that meets the power requirement to the external apparatus.

* * * * *